Feb. 28, 1933.  J. L. DUBOS  1,899,857
MOVABLE TOP PANEL FOR VEHICLES
Filed June 19, 1928   8 Sheets-Sheet 1
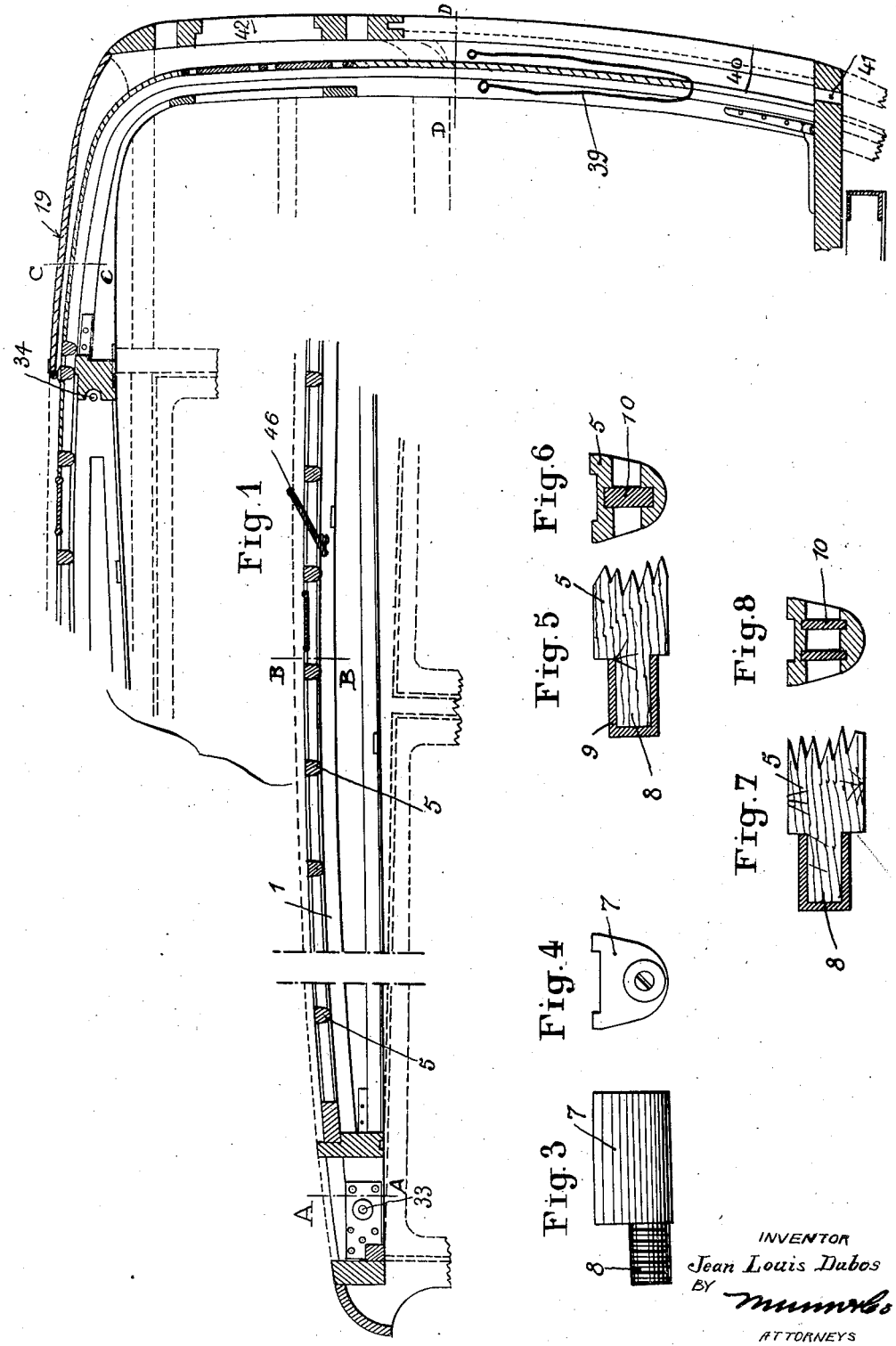
INVENTOR
Jean Louis Dubos
BY
ATTORNEYS

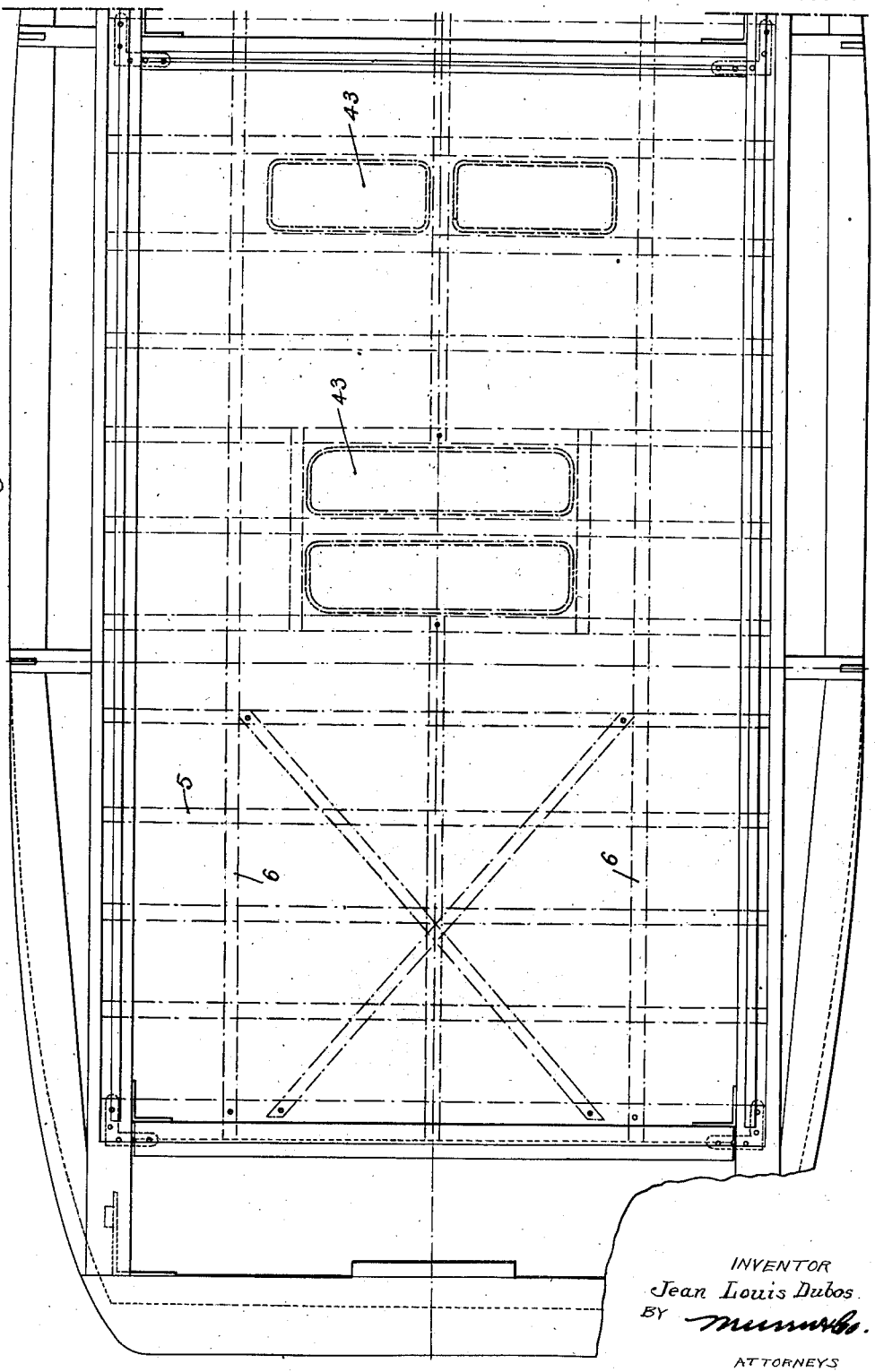

Feb. 28, 1933.  J. L. DUBOS  1,899,857
MOVABLE TOP PANEL FOR VEHICLES
Filed June 19, 1928  8 Sheets-Sheet 3
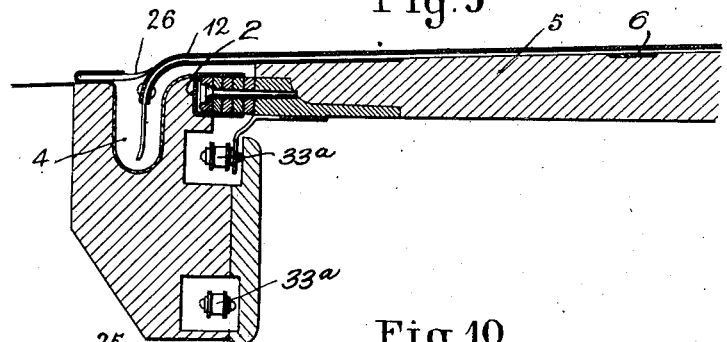
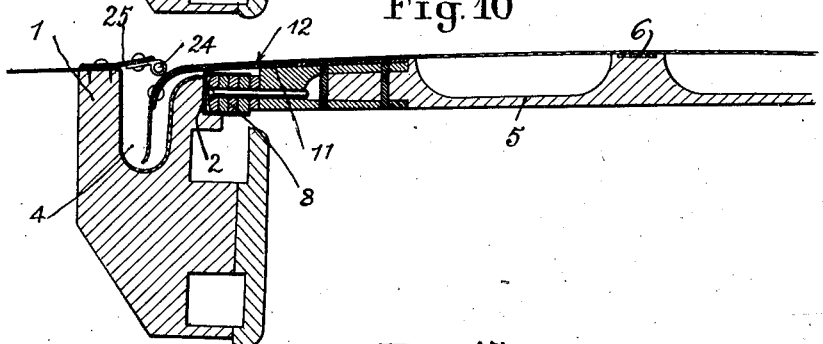
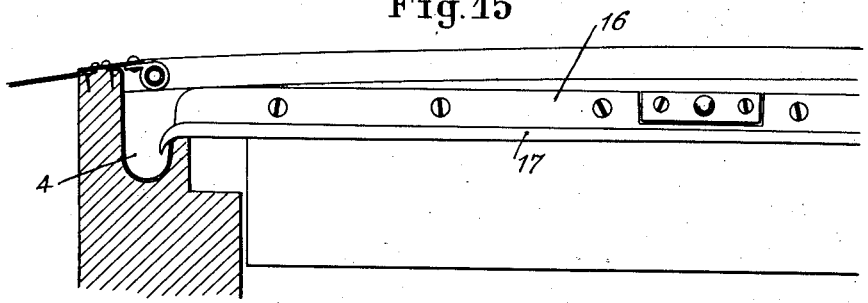
INVENTOR
Jean Louis Dubos
BY
ATTORNEYS Feb. 28, 1933.                J. L. DUBOS                1,899,857
                      MOVABLE TOP PANEL FOR VEHICLES
                        Filed June 19, 1928        8 Sheets-Sheet 4

INVENTOR
Jean Louis Dubos
BY
ATTORNEYS

Feb. 28, 1933.   J. L. DUBOS   1,899,857
MOVABLE TOP PANEL FOR VEHICLES
Filed June 19, 1928    8 Sheets-Sheet 6

INVENTOR
Jean Louis Dubos
BY
ATTORNEYS

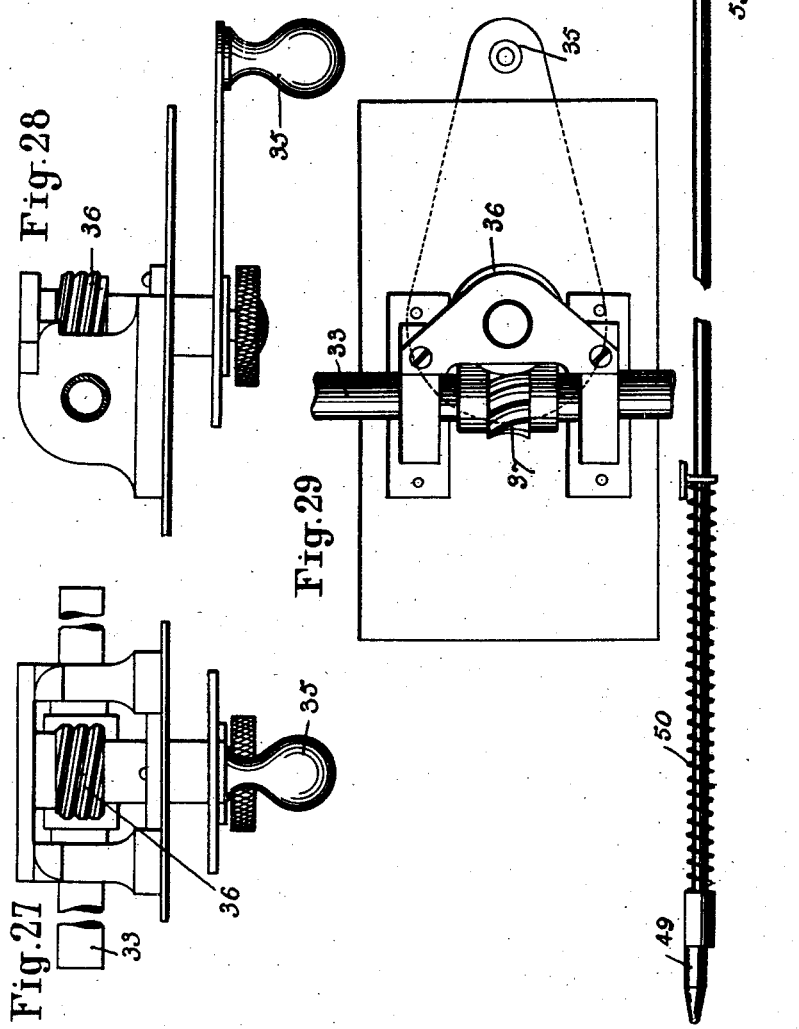

Feb. 28, 1933.  J. L. DUBOS  1,899,857
MOVABLE TOP PANEL FOR VEHICLES
Filed June 19, 1928   8 Sheets-Sheet 8

INVENTOR
Jean Louis Dubos
BY
ATTORNEYS

Patented Feb. 28, 1933

1,899,857

UNITED STATES PATENT OFFICE

JEAN LOUIS DUBOS, OF NEUILLY SUR SEINE, FRANCE

MOVABLE TOP PANEL FOR VEHICLES

Application filed June 19, 1928, Serial No. 286,550, and in France October 5, 1927.

The present invention relates to improvements in vehicle bodies provided with movable top panels.

It relates more particularly to the arrangement of the movable top itself and its means of support, the configuration of the vehicle top itself, the means assuring fluid tight conditions for the said top, the means for stowing the movable top portion at the rear of the vehicle, the arrangement of observation holes whereby the driver can observe the road in the rear of the vehicle when the top part is opened, a particular arrangement of wind shield assuring the complete protection of the occupants of the rear seats when the vehicle top is open, as well as a device for holding the said vehicle top in the intermediate position.

The appended drawings show by way of example various constructional forms of the improvements according to the invention.

Figs. 1 and 2 are respectively a longitudinal section and a plan view of the vehicle body and its removable top.

Figs. 3 and 4 are respectively a side elevation and an end view of a forked bracket for guiding purposes which is disposed at either end of the arched members supporting the vehicle body.

Figs. 5—6 and 7—8 are views analogous to Figures 3 and 4, of modifications of the said Figures 3 and 4.

Figs. 9 and 10 are cross sections showing two constructions of the device assuring the guiding and the fluid tightness of the vehicle top.

Figure 11:
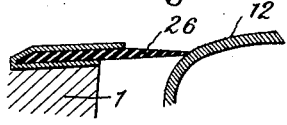
Figure 12:
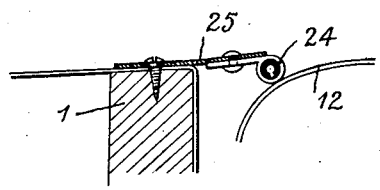

Figs. 11 and 12 are modifications of Figs. 9 and 10.

Figure 13:
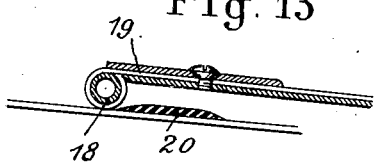
Figure 14:
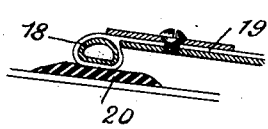

Figs. 13 and 14 show a device for fluid tight construction of the vehicle top, in two different positions.

Fig. 15 is a detail of the front cross-piece framing the opening of the vehicle.

Figure 16:
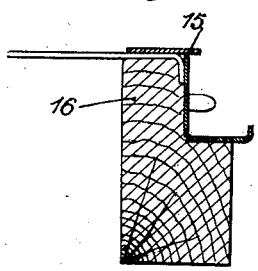
Figure 17:
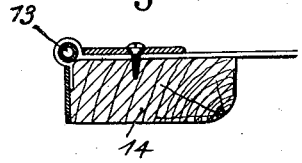

Figs. 16 and 17 are longitudinal sections of the fluid tight arrangement of the said front cross-piece.

Figs. 18, 19, 20 and 21 are modified forms of the joint of the vehicle top.

Figure 22:
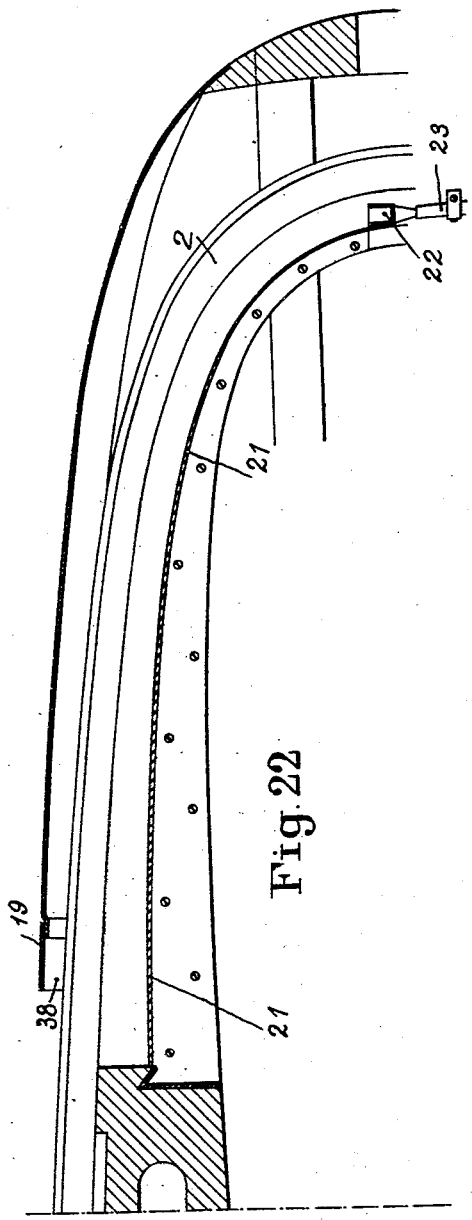
Figure 23:
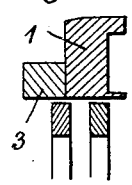
Figures 24, 25, 26:
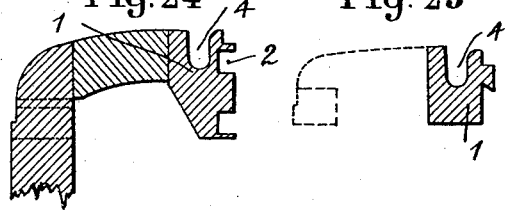

Fig. 22 is a longitudinal section of the rear part of the vehicle top, showing means assuring the fluid tightness of the vehicle body.

Figs. 23, 24, 25 and 26 are partial cross sections of the outer frame of the vehicle top, respectively at the points shown at A—B—C—D of Figure 1.

Figs. 27, 28 and 29 are respectively a front view, a side elevation and a bottom view of the mechanism for actuating the vehicle top.

Figure 30:
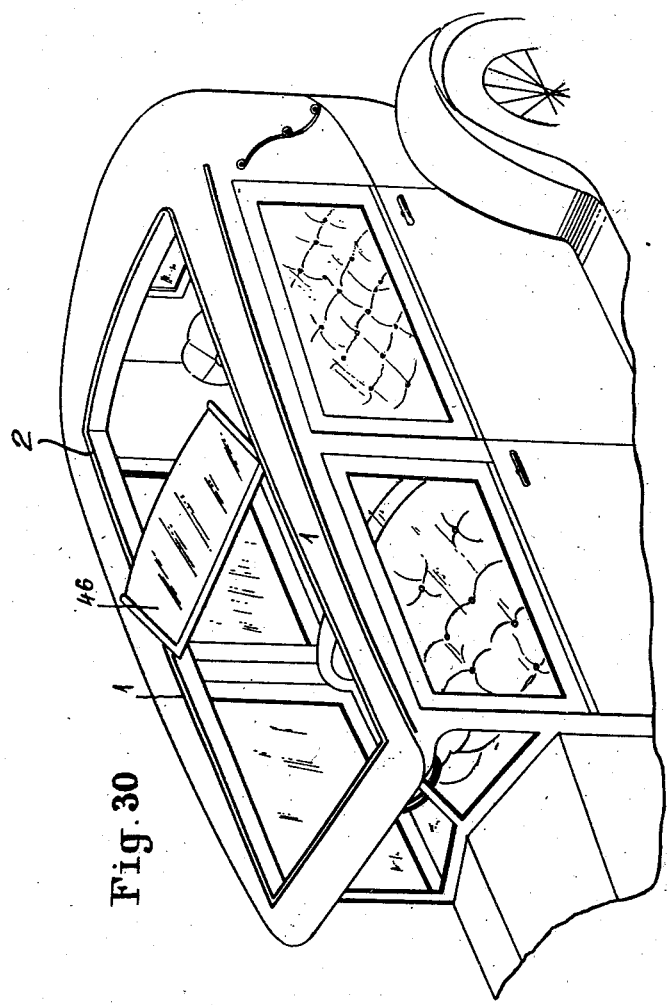

Fig. 30 is a perspective view of the vehicle top in the open position showing the wind shield used for the rear seats.

Figure 31:
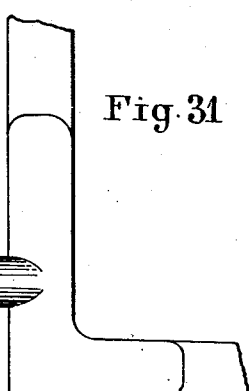
Figure 32:
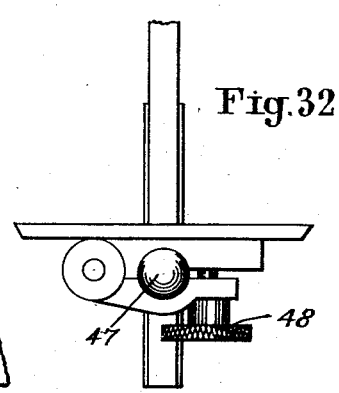

Figs. 31 and 32 show details of the mechanism for operating the said wind shield.

Figure 34:
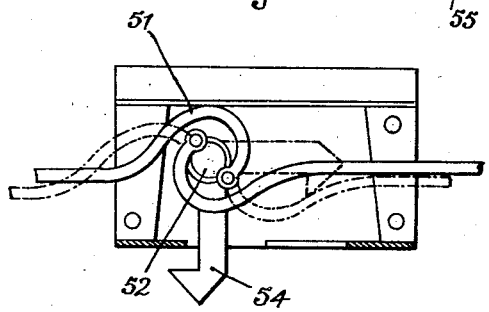

Figs. 33 and 34 are respectively an elevational and a plan view of the device for holding the vehicle top.

Figure 35:
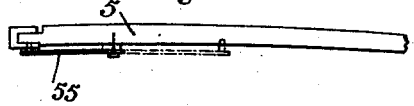

Fig. 35 is a diagrammatic view of a modified device for holding the vehicle top in the closed position.

Figure 36:
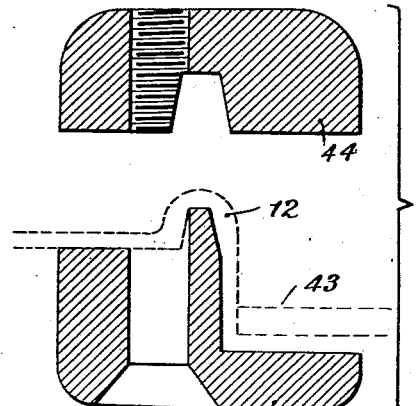

Fig. 36 is a detail view of the arrangement, in the movable top, of the pane used to cover the rear movable observation aperture.

The vehicle top comprises the lateral frames 1 of wood or metal which are mounted upon the vehicle body and in which are formed the grooves 2 for the sliding of the movable top panel. These two frames extend outwardly of the vehicle body at the front of the vehicle, as shown at 3 in Fig. 23, so as to reduce the thickness of the lateral frames and to increase the visibility. The said frames comprise the troughs or channels 4 (Figs. 24—25) for the discharge of water, and said channels may be faced with copper, zinc, imitation leather or like waterproof substance.

The movable part of the roof comprises the curved members or arches 5 which may be employed in any suitable number and may consist of wood or like material, these having the transverse position and being connected together by longitudinal bands 6 of a suitable flexible or elastic substance, such as spring steel strips which are properly distributed. At each end of the respective arch 5 is a forked member 7, for instance of metal, supporting a stud 8 of any suitable substance, and preferably of leather, whereby the device will readily slide without noise. The said studs may also be constructed as shown in Figs. 5 and 6, as an extension of the arch 5 itself, and the stud may be provided with a facing 9 as shown in Fig. 5, or may receive a leather band 10 (Fig. 6) or a plurality of such bands (Fig. 8). The portions 8 and 10 consist preferably of greased leather which provides for the proper sliding conditions and for a long duration of the device; the discs forming studs in the case of Fig. 3 are preferably cemented together in such manner as to form a device which is rotatable on its supporting axis. The said studs or bands may consist of any suitable substance such as hard or soft rubber, fibre, wood, steel, or the like.

Each of the curved members 5 may be recessed at various points on its length, as shown in Fig. 10, and it is provided at each end with a support 11 which preferably consists of a plate of a metal, optionally elastic, and having a straight or curved shape, which carries in the interior of the recess 4 the flexible canvas or like covering 12 of the vehicle top, said covering being preferably riveted near the end of each plate 11, as shown in Figs. 9 and 10.

The said movable top panel is made fluid tight at the front part of the vehicle body, as shown in Figs. 15, 16 and 17, for instance by means of an india rubber tube 13 (Fig. 17) which is secured to the upper front edge of the front cross-piece 14 and which may be maintained in any suitable manner upon said cross-piece, said tube coacting in the closing position with a suitable metal strip 15 disposed upon the stationary cross-piece 16 of the vehicle body.

A transverse trough 17 (Fig. 15) empties into the longitudinal trough 4 to provide for the discharge of any water which may enter through the joint.

I may obviously invert the arrangement shown in Figs. 16 to 17, the tube 13 being mounted on the stationary cross-piece 16 and the strip 15 on the movable cross-piece 14.

At the rear end of the vehicle top, the joint is assured by the tube 18—preferably of india rubber—which is suitably secured to the edge of the rear stationary top 19 (Figs. 13—14); a spacing strip 20 which may consist of leather, india rubber or like flexible substance, is secured to the rear of the movable vehicle top panel, and will take a position below the tube 18, as shown in Fig. 14, when the movable top panel is brought into the closing position, whereby a tight joint will be assured.

To prevent, with a still greater certainty, all entrance of water into the interior of the vehicle body, I may dispose, preferably adjacent the rear joint, as shown in Fig. 22, a covering member 21 consisting of a suitable waterproof substance, which discharges into a transverse channel 22 provided with an offtake conduit 23, any water which may have entered through the joint.

The lateral water tight joints of the vehicle top are formed at each side of the vehicle, as shown in Figs. 10 and 12, by a tube of india rubber or like substance 24 which is surrounded by a suitable sheathing, said tube being mounted on the stationary frame 1 by a suitable plate 25, optionally elastic, and in this manner the said tube 24 is applied upon the movable vehicle top panel 12, thus preventing all access of water in an effective manner. The arrangement may also be made fluid tight (Figs. 9 and 11) by a simple band 26 of india rubber or the like which is suitably mounted on the corresponding frame 1 and fits upon the top portion 12. In all cases, the joint is formed at the exterior of the grooves 2 coacting with the studs 8, as will be chiefly observed in Figs. 9 and 10.

Figure 18:
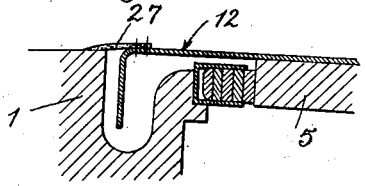
Figure 19:
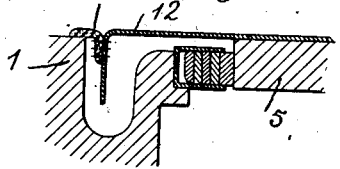
Figure 20:
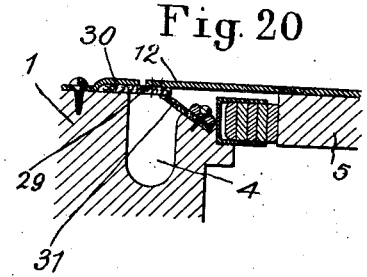
Figure 21:
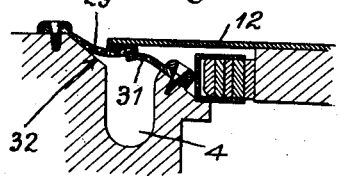

The fluid tight conditions may also be obtained, as shown in Fig. 18, by a band 27 consisting of india rubber or like material, which is secured to the said frame by sewing or otherwise, and is applied by its elasticity upon the movable part 12 of the vehicle top, or as shown in Fig. 19 by an angle piece 28 forming the joint on the vertical part of the flange of the vehicle top 12, or as shown in Fig. 20, by a band 29 secured to the movable top 12 and engaging in a joint cover 30 secured to the frame 1, and fitting upon a second plate 31 (or tube) for instance of india rubber, secured to the inner edge of the channel 4. To increase the freedom of movement of the vehicle top, I may also, as shown in Fig. 21, apply the india rubber band 29 upon a portion 32 of the said channel, which may be suitably bevelled.

The water collecting in the channels 4 will be discharged at the front and rear by spouts of suitable form.

The front cross-piece of the top is connected in any approved manner, to the lateral frames 1, the frames 1 supporting at their forward ends a shaft 33 and at their rear ends a shaft 34. Any suitable drive means may be connected between these shafts 33 and 34, such as chains 33ᵃ (see Fig. 9), in order to establish simultaneous rotation of the shafts. Certain of the arch members 5 are connected to links of the chains so that upon rotation of the shafts 33 and 34, the top panel 12 will be moved longitudinally of the grooves 2. The front shaft 33 is controlled by a device in the form of a winch which is mounted at the front part of the vehicle body and is actuated by a handle 35 (Figs. 27, 28 and 29) whose shaft carries a worm 36 coacting with a worm wheel 37 mounted on the shaft 33. Due to this control by irreversible worm gear, the movable vehicle top panel can be held open in any position, and it will be automatically held in place by the worm gear. The said control may obviously be effected at the rear of the vehicle, and it may be placed at any suitable height either at the front or rear in order to facilitate the operation.

The movable vehicle top panel is covered at the rear by the stationary partition 19, as shown in Figs. 20 and 22, which comprises an aperture 38 (Fig. 22) for the free circulation of the air entering the vehicle, while eliminating all whirling motion of the air. In the open position, the movable top panel rests upon an elastic frame 39 consisting for example of india rubber strips by which the top may be held in the open position while preventing all jarring. The said india rubber device 39 may be replaced by suitable metal or other springs of the spiral, plate or like type, disposed at the lower part of the rabbet 40 (Fig. 1) adapted to receive the movable vehicle top panel. At the lower part of said rabbet is disposed an aperture 41 for the discharge of any water which may enter below the top part 19, in this manner aiding in the elimination of whirling air.

To provide for the proper use of the customary observation aperture or window 42, when the movable vehicle top panel is in the open position, I provide in the said vehicle top the transparent panes 43 disposed at suitable points (Fig. 2) which may consist of glass or of mica; said panes have a sufficiently small size to enable them to follow the vehicle top in all its movements. The said panes 43 are secured as shown in Fig. 36 by the holding of the top part 12 between the part 44—45 of a suitable frame, so as to provide a fluid tight joint.

The vehicle body comprises, at a suitable point on its length, a movable wind shield 46 (Figs. 1 and 30) which has preferably a curved shape in order to protect the rear seats. The said shield comprises the studs 47 (Figs. 31—32) provided with screws 48 by which the wind shield may be held at any suitable inclination. The said wind shield may obviously consist of any suitable material such as glass, mica or like transparent substances, or even of an opaque substance.

When the vehicle top is to be directly controlled by hand, I dispose upon the front cross-piece of the said top, a device for operating and holding the vehicle top, which comprises the lateral fastening bolts 49 (Fig. 33) which are outwardly urged by the springs 50. Each bolt is terminated at the interior by a bent portion 51 (Fig. 34) coacting with a disc 52 mounted on the shaft of a knob or like controlling member 53; on the said shaft is mounted a catch 54 engaging in a staple formed in the stationary front cross-piece of the vehicle body. This disposition permits, by providing suitable apertures in the guiding grooves 2, to obtain any desired degree of opening of the vehicle top, and the said top can be automatically fastened in the closed position; the top can also be released in any position which it occupies, by operating the single member 53.

The vehicle top may be also secured in the lateral direction, as shown in Fig. 35, for instance by an elastic strip 55 of spring steel or the like which is secured to the end of the curved member 5 and coacts with a suitable fastening stud.

The said invention is applicable to opening vehicle tops for automobile and other vehicles, and in general for all suitable purposes, for instance upon railways, vessels, aircraft and the like.

What I claim is:

1. In a vehicle, the combination of a body having a compartment at the rear thereof, a window therein, a roof frame, said frame having guide-ways extending longitudinally of said roof and vertically of said compartment, a flexible roof panel slidable within said guide-ways, a window in said panel, means to move said panel within said guide-ways to aline said windows, and a flexible strap member secured within and extended across said compartment to support said panel.

2. In a vehicle, the combination of a body having a roof frame, guide rails extending longitudinally of said roof frame and vertically of said body at the rear thereof, a roof panel slidable within said rails, and a wind shield supported transversely between and above said guide rails and intermediate the length of said longitudinal guide rails.

3. In a vehicle, the combination of a body having a roof frame, guide rails extending longitudinally of said roof frame and vertically of said body at the rear thereof, a roof panel slidable within said rails, and a wind shield supported transversely between and above said guide rails and intermediate the length of said longitudinal guide rails, said wind shield being adjustable to assume various inclinations from a horizontal to a vertical position.

In testimony whereof I have hereunto set my hand at Paris, this 7th day of June 1928.

JEAN LOUIS DUBOS.